UNITED STATES PATENT OFFICE.

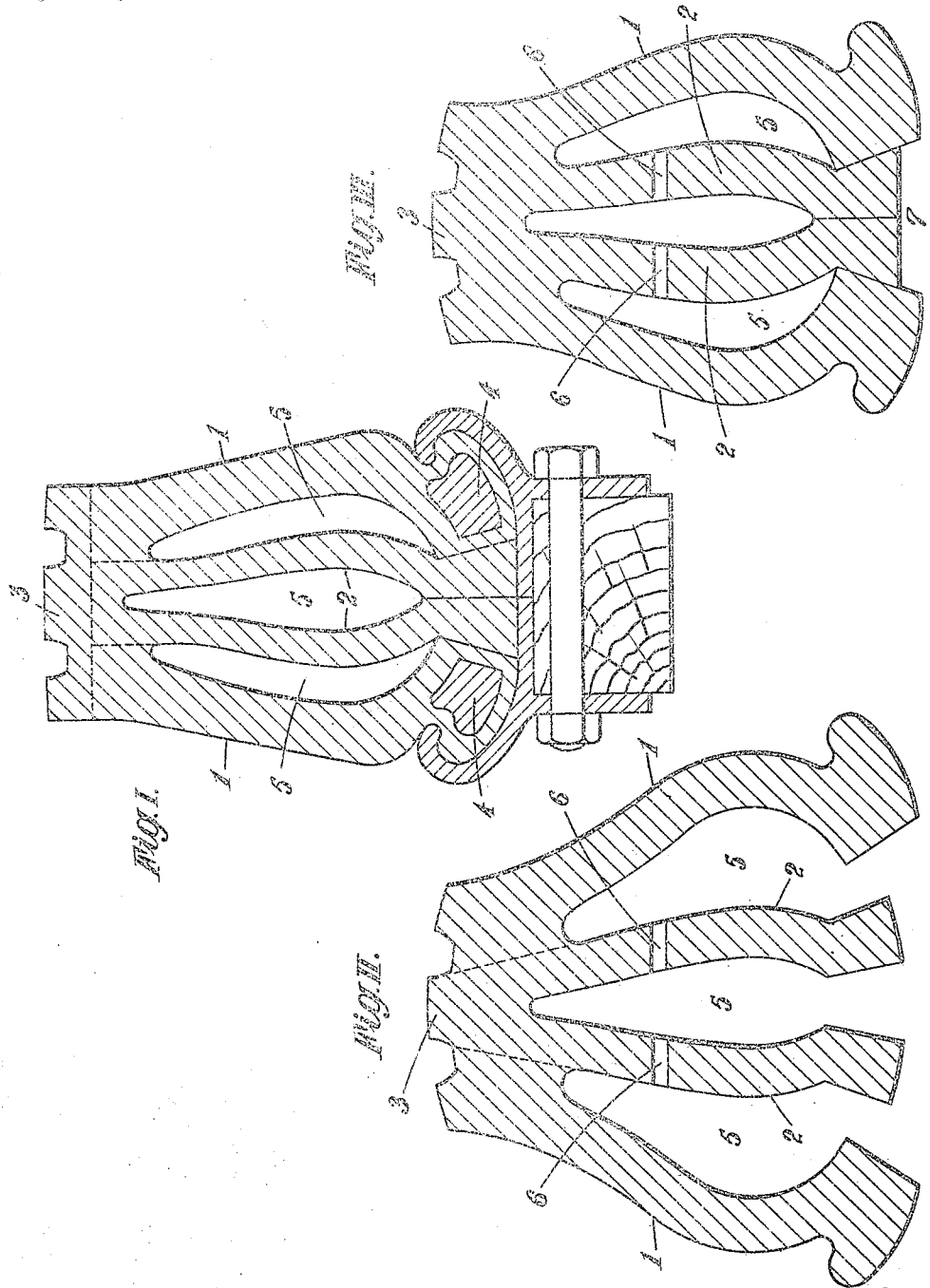

WILLIAM DRURY, OF LONDON, ENGLAND.

TIRE FOR VEHICLE-WHEELS.

1,262,186.  Specification of Letters Patent.  Patented Apr. 9, 1918.

Application filed May 16, 1914. Serial No. 839,066.

*To all whom it may concern:*

Be it known that I, WILLIAM DRURY, subject of the King of Great Britain and Ireland, residing at London, W., England, have invented certain new and useful Improvements in Tires for Vehicle-Wheels, of which the following is a specification.

The present invention relates to tires for vehicle wheels of that type in which there are vertical longitudinal walls. It consists in a rubber tire which when in position on the rim has two inner walls extending from or near the base to the inside of the crown so as to form three air chambers, the central chamber being formed by the spreading apart of the two inner walls. The said air chambers may be inflated by known means or not as desired.

Referring to Figure I of the accompanying drawings this illustrates in transverse section one form of tire constructed in accordance with the present invention and mounted in a clencher divided rim. In this embodiment of the invention a separate tread is applied as indicated by the horizontal dotted line, and the inner walls extend from the base to the inside of the crown of the tire.

Fig. II illustrates in transverse section a slightly modified form of tire, showing the walls splayed as the tire comes from the vulcanizing molds, in which a separate tread has been dispensed with and the outer walls are so shaped that non-skid ridges or corrugations are formed on the finished tire and in which the inner walls when brought together do not extend from the base as shown in Fig. I but from near the base as shown in Figs. II and III.

Fig. III further illustrates in transverse section the tire shown in Fig. II with the ends of its splayed walls brought together in the position they would occupy in a clencher divided rim.

In all the drawings similar numerals of reference refer to like parts.

I usually manufacture the tires in parts (as indicated by dotted lines in Figs. I and II.) Thus the outer walls, 1, 1 may be made separately and the inner walls 2, 2 in one piece, the other parts of the walls being then brought together and vulcanized along the surfaces indicated by the vertical dotted lines in Figs. I and II. The tread 3 may then be applied as shown in Fig. I. Or, a separate tread may be dispensed with if the outer edge of the walls are suitably shaped so that "non-skid" ridges or corrugations are formed on the finished tire as indicated in the figures. Or, any convenient known form of tread may be employed. Cores 4 of hard rubber and canvas, as illustrated in Fig. I, may be used to reinforce the clenched beads of the tire.

If desired any of the known wedging devices, operated by screws or otherwise passing through the rim and felly, may be provided to force the feet of the inner wall or walls tightly against those of the outer walls and to prevent the tire creeping on the rim. The air chambers 5, 5, 5 may be inflated or not as desired and holes 6, 6 may be formed in the inner walls 2, 2 in order that the pressure in the three chambers may be equalized. Under ordinary circumstances excellent results may be obtained without inflation but in cases of heavy traction a certain degree of inflation is sometimes found advisable.

The splaying of the walls as illustrated in Fig. II, not only stiffens the tire, when the splayed ends are brought together in the clencher divided rim, but by the cross tension so given to the tire assists in maintaining the locking beads in the channels provided in the clencher rim for their reception and insures air tight joints between the outer and inner walls. This maintenance of the locking beads in the channels provided in the clencher rim for their reception is also assisted by the spreading apart of the two inner walls throughout their length or throughout the greater part of their length.

By the shortening of the inner wall or walls from near the base (so as to leave a space 7 before tightening up) as illustrated in Fig. II instead of from the base as illustrated in Fig. I, I find from practical experience that I gain a distinct advantage.

Having thus described my invention what I claim as new and desire to secure by Letters Patent is:—

1. A tire for vehicle wheels having two vertical inner walls dividing the interior of the tire into three chambers, the lower ends of the inner walls terminating above the lower ends of the outer walls and thereby providing a space below the lower ends of said inner walls before tightening up.

2. A tire for vehicle wheels having outer walls and inner walls dividing the interior of the tire into a series of longitudinally disposed chambers and the inner ends of the inner walls being adapted to be interposed between the inner ends of the outer walls and terminating above the inner ends of the outer walls thereby providing a space below the inner ends of said inner walls before tightening up.

3. A tire for vehicle wheels having outer walls and inner walls dividing the interior of the tire into a series of longitudinally disposed chambers and the inner ends of said inner walls being adapted to be interposed between the inner ends of the outer walls when locked together, said walls being normally splayed.

4. A tire for vehicle wheels having outer walls and inner walls dividing the interior of the tire into a series of longitudinally disposed chambers, the said inner walls being united at the outer ends to the tread and having the inner ends free and adapted to be interposed between the inner ends of said outer walls when locked together, the said walls being normally splayed.

In witness whereof I have signed my name to this specification in the presence of two subscribing witnesses.

WILLIAM DRURY.

Witnesses:
   E. G. REYNARD,
   ALFRED TODD DAVEY.